US006972713B2

(12) United States Patent
Mosher et al.

(10) Patent No.: US 6,972,713 B2
(45) Date of Patent: Dec. 6, 2005

(54) METHOD, APPARATUS, AND COMPUTER PROGRAM PRODUCT FOR RADAR CROSSRANGE SUPERRESOLUTION

(75) Inventors: Aaron Y. Mosher, Madison, AL (US); Peter Wittenberg, Creve Coeur, MO (US)

(73) Assignee: The Boeing Company, Chicago, IL (US)

( * ) Notice: Subject to any disclaimer, the term of this patent is extended or adjusted under 35 U.S.C. 154(b) by 60 days.

(21) Appl. No.: 10/781,500

(22) Filed: Feb. 18, 2004

(65) Prior Publication Data

US 2005/0179587 A1 Aug. 18, 2005

(51) Int. Cl.$^7$ .............................................. G01S 13/48
(52) U.S. Cl. ........................ 342/147; 342/157; 342/158; 342/194
(58) Field of Search ................................ 342/147, 148, 342/157, 158, 189, 194, 195, 70–72, 90

(56) References Cited

U.S. PATENT DOCUMENTS

| | | | | |
|---|---|---|---|---|
| 3,858,203 | A | * | 12/1974 | Constant ...................... 342/351 |
| 4,067,009 | A | * | 1/1978 | Constant .................... 342/25 A |
| 4,433,334 | A | * | 2/1984 | Caputi, Jr. ................... 342/450 |
| 4,683,474 | A | * | 7/1987 | Randig ........................ 342/368 |
| 5,059,966 | A | * | 10/1991 | Fujisaka et al. .......... 342/25 A |
| 5,430,445 | A | * | 7/1995 | Peregrim et al. ......... 342/25 C |
| 5,831,570 | A | * | 11/1998 | Ammar et al. ............. 342/26 B |
| 5,892,700 | A |  | 4/1999 | Haardt |
| 5,977,906 | A | * | 11/1999 | Ameen et al. ............... 342/174 |
| 6,078,281 | A | * | 6/2000 | Milkovich et al. .......... 342/196 |
| 6,085,151 | A | * | 7/2000 | Farmer et al. .............. 701/301 |
| 6,127,974 | A |  | 10/2000 | Kesler |
| 6,225,948 | B1 |  | 5/2001 | Baier et al. |
| 6,498,581 | B1 |  | 12/2002 | Yu |
| 6,563,451 | B1 | * | 5/2003 | Krikorian et al. .......... 342/25 R |
| 6,721,235 | B2 | * | 4/2004 | Chiang et al. ............... 367/138 |
| 2005/0046607 | A1 | * | 3/2005 | Volman ....................... 342/109 |
| 2005/0140540 | A1 | * | 6/2005 | Rees et al. ..................... 342/29 |
| 2005/0179587 | A1 | * | 8/2005 | Mosher et al. .............. 342/147 |

OTHER PUBLICATIONS

"The multisensor tracking system with the airborne sensor to mitigate the effect of cross-range errors", Kawamoto, D.; Kawase, T.; Hashirao, M.; Sasase, I. Vehicular Technology Conference, 2000. IEEE VTS-Fall VTC 2000. 52nd vol. 5, 2000 P(s):2101–2107.*

"An analysis of tracking gate for maneuvering targets", Matsuzaki, T.; Ito, M.; Kosuge, Y. SICE 2002. Proceedings of the 41st SICE Annual Conference vol. 1, Aug. 5–7, 2002 Page(s): 187–192.*

* cited by examiner

Primary Examiner—John B. Sotomayor
(74) Attorney, Agent, or Firm—Alston & Bird LLP

(57) ABSTRACT

Methods, apparatus, and computer program products are provided for improving the crossrange resolution of a radar device for more accurate determinations of angular position of a target. The radar device transmits and receives scanning signals at crossrange beam positions having a beamwidth, wherein the beam positions are separated by a step. The radar device scans a target to receive target data from at least three beam positions, typically consecutive beam positions, to determine a first beam position with a first target data value that is greater than a second target data value of a second beam position preceding the first beam position and greater than a third target data value of a third beam position following the first beam position. A target data relationship between the first, second, and third beam positions is determined to provide the angular position of the target relative to the first beam position.

32 Claims, 3 Drawing Sheets

| RADAR DEVICE DATA | | |
|---|---|---|
| BEAM POSITION | ANGULAR POSITION | TARGET DATA VALUE |
| 1 | 0.9° | 0.1 |
| 2 | 1.8° | 0.4 |
| 3 | 2.7° | 0.9 |
| 4 | 3.6° | 0.4 |
| 5 | 4.5° | 0.3 |
| 6 | 5.4° | 0.8 |
| 7 | 6.3° | 0.6 |
| 8 | 7.2° | 0.2 |

FIG. 2

METHOD, APPARATUS, AND COMPUTER PROGRAM PRODUCT FOR RADAR CROSSRANGE SUPERRESOLUTION

BACKGROUND OF THE INVENTION

1. Field of the Invention

The present invention is related to target positioning systems, and more particularly, to a method, apparatus, and computer program product for improving the crossrange resolution of a target positioning system.

2. Description of Related Art

Target positioning systems, such as radar devices, transmit scanning signals, such as electromagnetic or sonar signals, that advantageously reflect off objects and are received by the target positioning system to provide data related to the position of the object. Radar devices comprise an antenna that transmits and receives the radar signals. Signals received by the radar device provide target data such as distance from the radar device or size of the target. Some radar devices, such as a radar device used on an autonomous vehicle, rotate the antenna about an axis to produce target data at individual data collection intervals, also known as beam positions, in a crossrange direction. Advantageously, such radar devices rotate 360 degrees to provide panoramic target data. However, the crossrange resolution of such radar devices is limited.

Radar antennas are defined by their elevation beamwidth and azimuth beamwidth. For a single beam position of an antenna, the elevation beamwidth is defined in the vertical plane of the antenna, and the azimuth beamwidth is orthogonal to the elevation beamwidth. The elevation beamwidth is typically greater than the azimuth beamwidth, an example being a radar having a 20 degree elevation beamwidth and a 1.8 degree azimuth beamwidth. A target within the mainbeam, which is defined by the elevation and azimuth beamwidths of the radar device, will echo the radar signal such that target data is provided for that beam position. Real beam crossrange resolution is directly proportionate to azimuth beamwidth. Radar devices typically have much better range resolution, for determining a linear distance from the antenna to the target, than crossrange resolution, for determining the angular position of the target relative to the radar device. Therefore, a rotating antenna typically rotates in a direction along the azimuth beamwidth, which is also called the crossrange beamwidth. Each beam position of the rotating antenna is separated by a step, which is the angular distance between the centers of the antenna mainbeams for two consecutive data collection intervals.

Crossrange resolution of a radar device is typically defined by the azimuth beamwidth of the radar device because the radar device detects a target within the azimuth beamwidth but is unable to locate the target within that azimuth bin, which is the distance between the edges of the azimuth beamwidth at the location of the target. In other words, the rotating, or sweeping, antenna produces a single target data value for the azimuth beam width of each beam position, so if a target data value indicates the presence of a target, the radar device is unable to determine where the target is located within the azimuth bin. For a radar device with a 1.8 degree azimuth beamwidth, at 100 meters from the radar device the beam position defines a 3 meter azimuth bin. In such a situation, the radar device is unable to determine where within the 3 meter azimuth bin the target is positioned. Accordingly, the crossrange resolution of a radar device is limited by the azimuth beamwidth.

One method for improving the crossrange resolution of a radar device is by producing a synthetic aperture radar (SAR). An SAR improves crossrange resolution of a radar device by utilizing forward movement of the radar. The structure of the radar signals transmitted and received by the moving radar device changes as the radar device passes by a target, according to the Doppler effect. The frequency of the radar signal changes according to the speed that the radar device is moving; therefore, the changes in frequency of the target signals, relative to the speed of the radar device, allow a radar device to improve the crossrange resolution based upon the Doppler shift. However, such a solution is not available for radars that need to look forward, such as radar devices on autonomous vehicles that must accurately determine the angular position of targets in the path of the radar device to avoid such targets.

A second solution for improving the crossrange resolution of a radar device is by reducing the azimuth beamwidth of the radar device. However, a relatively small beamwidth gives rise to additional concerns. By decreasing the azimuth beamwidth of a radar device, the step size of the radar device must be reduced accordingly to ensure that no gaps are created between the beam positions. Reducing the step size decreases the frequency at which target data is provided. However, radar devices typically require that targets are scanned at a certain frequency, particularly on moving autonomous vehicles, thus the antenna must sweep at a rate that provides timely target position data so that the autonomous vehicle can change its direction to avoid detected targets. Accordingly, the step size is advantageously increased because the larger the step size of the radar device, the faster the antenna rotates, thus providing target data with increased frequency. Therefore, a balancing of the width of the azimuth beamwidth and the size of the step provides target data with optimal crossrange resolution at a sufficient frequency; however, such optimized crossrange resolution may not provide sufficient target positioning for the particular application of the radar device. In addition, narrowing the azimuth beamwidth requires either the diameter of the antenna increase or the radio frequency used be increased. However, the diameter of the radar antenna is preferably minimized for typical radar applications, and the radio frequency available for radar devices is restricted; therefore, either alternative is limited.

Therefore, a need exists for improving the crossrange resolution of a radar device for a more accurate determination of the angular position of the target. Advantageously, the improved crossrange resolution would be accomplished without reducing the frequency that target data is provided.

BRIEF SUMMARY OF THE INVENTION

Methods, apparatus, and computer program products are provided according to the present invention for determining the angular position of a target. By comparing the target data received in a crossrange direction in accordance with the present invention, the crossrange resolution of the radar device, or other target positioning system, is improved for more accurate determinations of target position in the crossrange direction. In addition, the crossrange resolution of the radar device is improved without reducing the frequency at which target data is provided.

According to the present invention, the target is scanned with scanning signals at crossrange beam positions such that target data is received from a plurality of beam positions. Advantageously, a first beam position is determined, such as by processing circuitry, that has a first target data value that is greater than a second target data value at a second beam position preceding the first beam position and is greater than a third target data value of a third beam position following the first beam position. Advantageously, the three beam positions may be consecutive beam positions, with the second beam position immediately preceding the first beam position and the third beam position immediately following the first beam position.

A target data relationship is determined, such as by the processing circuitry, between at least two beam positions, such as the first, second, and third beam positions, to determine the angular position of the target relative to one beam position, such as the first beam position. Advantageously, the target data relationship is determined based upon a difference between the second target data value and the third target data value that is divided by the first target data value to define a normalized quotient. The normalized quotient is multiplied by a constant of the radar device to determine the angular position of the target relative to the first beam position, which is further used to determine the angular position of the target relative to the radar device. The constant is advantageously determined by calibrating the radar device by scanning a trial target at a known angular position relative to the radar device.

Therefore, embodiments of the present invention improve the crossrange resolution of a radar device to provide more accurate determinations of the angular position of the target. Furthermore, embodiments of the present invention improve crossrange resolution of the radar device without adversely affecting the timeliness of target data received by the radar device.

BRIEF DESCRIPTION OF THE SEVERAL VIEWS OF THE DRAWINGS

Figure 1:
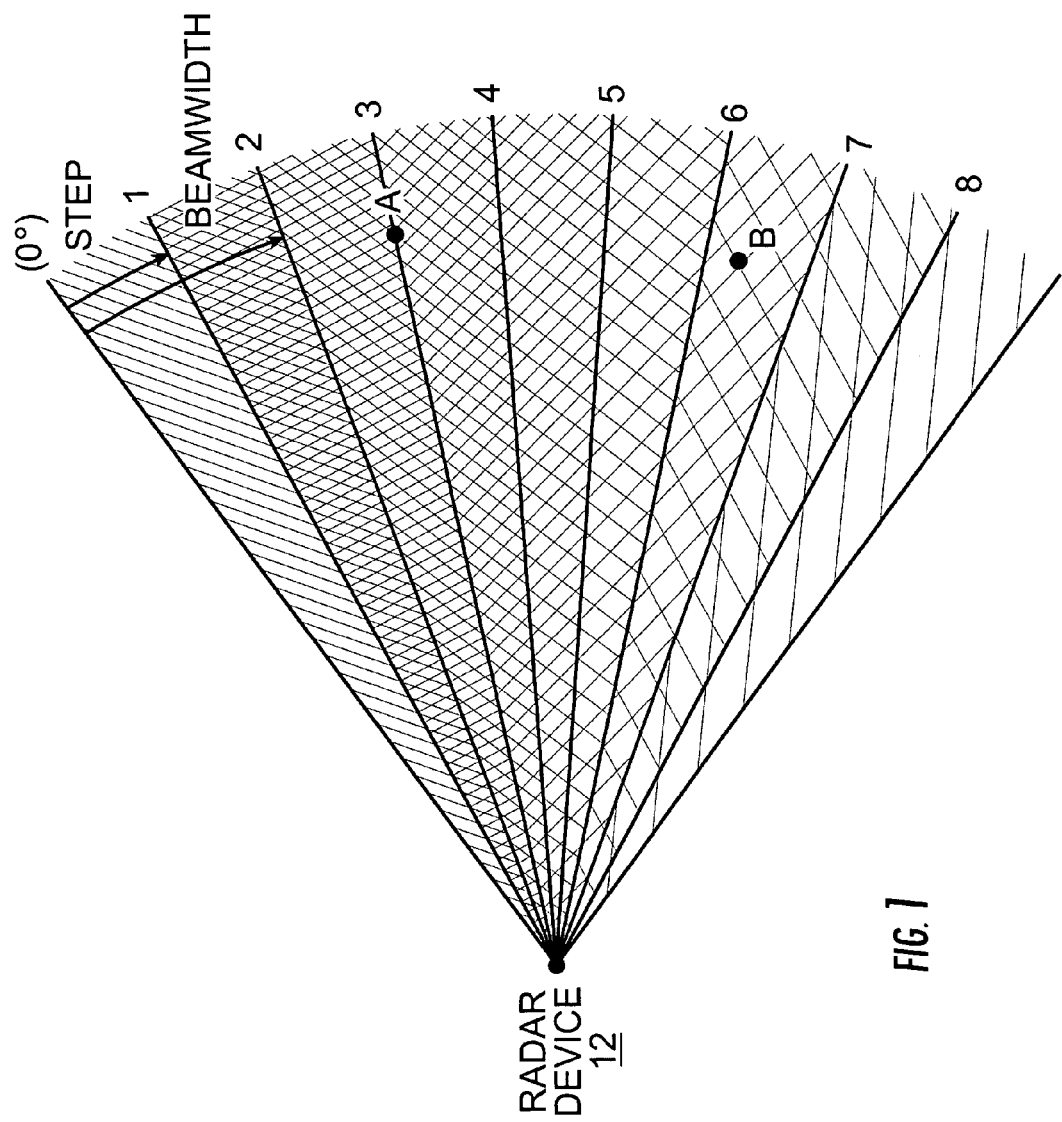
Figure 3:
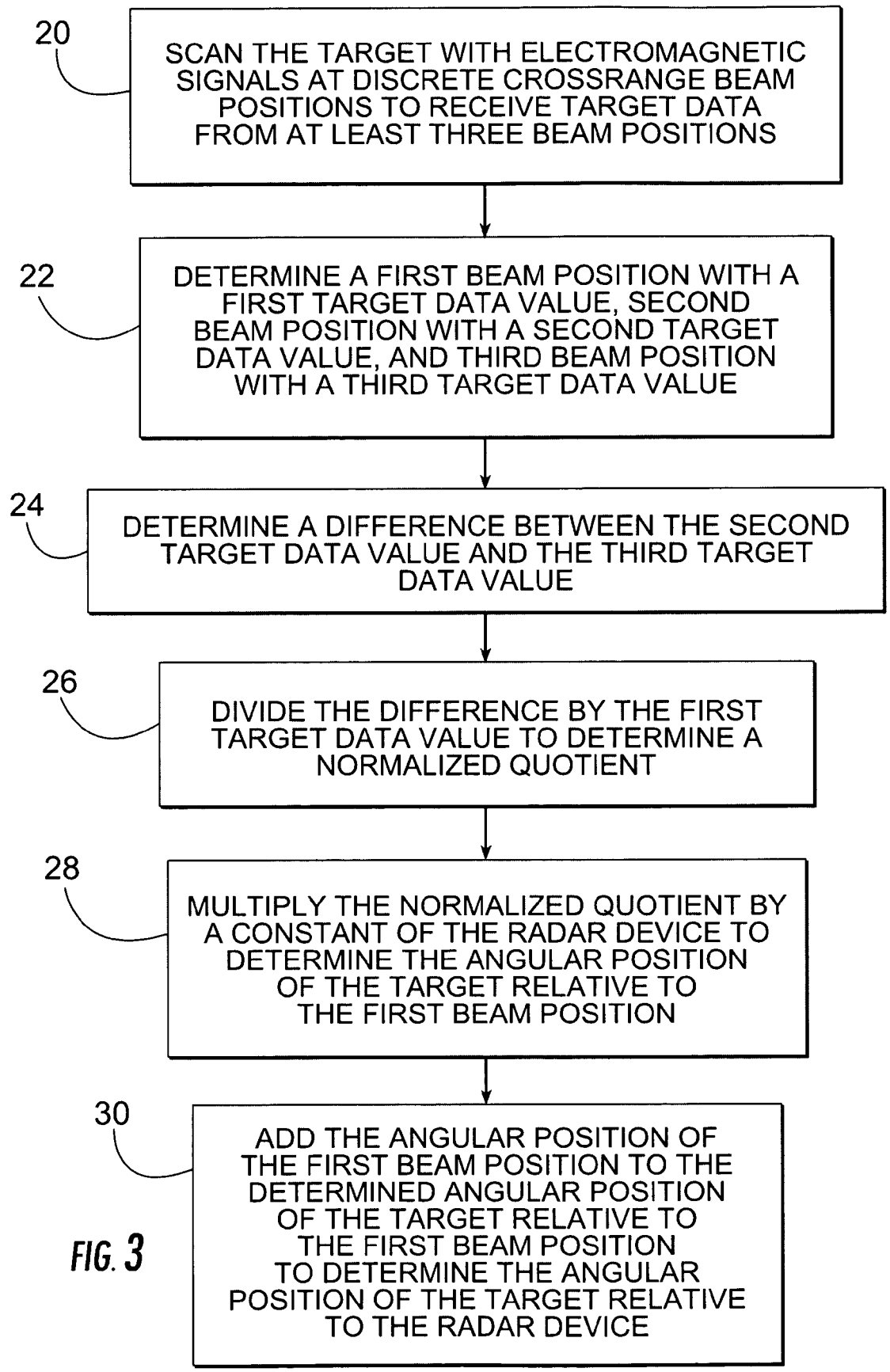

Having thus described the invention in general terms, reference will now be made to the accompanying drawings, which are not necessarily drawn to scale, and wherein:

FIG. 1 is a top diagrammatic view of a radar device scanning targets in accordance with one embodiment of the present invention, wherein the step size is approximately half the azimuth beamwidth;

FIG. 2 is a chart depicting target data values received by the radar device of FIG. 1 for each beam position, wherein the angular position of the center of each beam position is listed; and FIG. 3 is a flow chart illustrating steps to determine the angular position of a target with improved crossrange resolution of a radar device in accordance with one embodiment of the present invention.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIGS. 1–3, the determination of the angular position of one or more targets in accordance with one embodiment of the methods, apparatus, and computer program products of the present invention is illustrated.

Embodiments of the present invention improve the crossrange resolution of a target positioning system to more accurately determine the angular position of a target. This improvement of the crossrange resolution is also described as crossrange superresolution. The embodiments of the invention described herein are utilized in conjunction with a radar device, such as the DS2000 77 GHz Frequency Modulated Continuous Wave (FMCW) Radar manufactured by Navtech (Navtech DS2000). However, it should be appreciated that the other embodiments of the present invention may be utilized in conjunction with alternative radar devices and with other target positioning systems that transmit and receive scanning signals, such as electromagnetic signals, sonar signals, or the like. Non-limiting examples of alternative target positioning systems are laser radar devices, sonar devices, or the like.

Moreover, the methods, apparatus, and computer program products of the present invention may be employed in various applications such as in conjunction with an autonomous vehicle in order to locate objects or obstacles, generally described herein as targets, that the vehicle should avoid. Because of the speeds at which the vehicle travels, the methods, apparatus, and computer program products of the present invention must provide timely target data with sufficient resolution to enable the vehicle to avoid the target.

By way of example, the radar device 12 of FIG. 1, such as the Navtech DS2000, has an azimuth beamwidth of 1.8 degrees. The Navtech DS2000 sweeps at a frequency of 2.5 Hz with a sweep time of 1 millisecond wherein the sweep time defines the duration between steps. Therefore, the Navtech DS2000 defines a crossrange step of 0.9 degrees (2.5 cycles/second*360 degrees/cycle*0.001 second= 0.9 degrees). Thus the step of the radar device 12, which is illustrated by the shorter arrow of FIG. 1, is half the beamwidth of the radar signal, which is illustrated by the longer arrow of FIG. 1. Therefore, not only do no gaps exist in the crossrange direction of the Navtech DS2000, but each sector between steps is scanned twice per revolution of the antenna. Each beam position of FIG. 1 is annotated with a number 1 through 8 and each beamwidth comprises the sector immediately above and the sector immediately below the numbered line, such that the numbered line defines the center of the azimuth beamwidth, which is also the center of the azimuth bin. The numbered lines also define step lines, wherein step line 1 represents the first step from the 0 degree reference line, step line 2 represents the second step, and so forth. It should be noted that the annotated beamwidths are not to scale, and that each beamwidth is illustrated with a unique hatch pattern. It should also be appreciated that the term "sector" used herein describes the area bounded by two step lines, such as the lines numbered 1 and 2, and the sector is not confined by an intercepted arc because the sector may be considered to extend indefinitely.

FIG. 1 also illustrates two targets A and B represented as circles. Targets A and B may be of any size and shape and may be positioned at any location relative to the radar device or one another. As shown in FIG. 1, target A is located in the middle of beam position 3, such that the step line numbered 3 bisects the target A. Target B of FIG. 1 is located between step lines 6 and 7, slightly closer to step line 6 than step line 7. For discussion purposes, both Target A and B are considered to be 100 meters from the radar device 12; however, it should be appreciated that the targets requiring a determination of angular position may be located at any distance from the radar device at any point in time. A radar device having an azimuth beamwidth of 1.8 degrees defines an azimuth bin of approximately 3 meters at a distance of 100 meters ([1.8 degrees/57.3 degrees/radians]*100 meters≈3 meters). A radar device using previous target positioning techniques would locate the target 100 meters to within a particular azimuth bin but would not be able to more accurately determine the angular position of the target within the 3 meter width of the azimuth bin. The methods, apparatus, and computer program products of the present invention provide an improved technique for determining the angular position of a target within an azimuth bin, as discussed hereinafter.

The sweeping of the radar device 12 of FIG. 1 produces a target data value for each of the beam positions. The radar device 12 of the illustrated embodiment may comprise a mechanically scanned antenna or an electrically scanned antenna. Further embodiments of the present invention may comprise alternative scanning techniques or devices for the various target positioning system. FIG. 2 is a chart representing exemplary target data values for each of the beam positions of FIG. 1. The angular position of the center of each beam position is also indicated on the chart of FIG. 2. It should be appreciated that the 0 degree reference line above step line 1 represents an angular position of 0 degrees for purposes of this disclosure. Further embodiments of the present invention may define the 0 degree angular position at any direction relative to the radar device and may define beam positions and step sizes of any relative angular distance. It should also be appreciated that the target data values provided in FIG. 2 are representative only, and that further embodiments of the present invention may define alternative target data values or define alternative relative values for the target data values. Furthermore, target data values of further embodiments advantageously provide more precise target data values than the 0.1 increments illustrated, with non-limiting examples including a target data value for beam position 1 to be 0.1376 and for beam position 2 to be 0.3997 and so forth. In addition, the target data value may be of any unit, such as volts, amps, watts, or the like, used by the target positioning system.

Referring again to FIG. 1, prior art target positioning techniques would be able to determine that target A is located within beam position 3, and possibly in beam positions 2 or 4, but would be unable to more precisely determine the angular position of target A within beam position 3. Likewise, prior art target positioning techniques would be able to determine that one or more targets exist within beam positions 6 and 7, but would be unable to determine whether only one target is located in both beam positions or if one or more targets are located in each beam position. The methods, apparatus, and computer program products of the present invention allow the target positioning system to accurately determine the angular position of a target within an azimuth bin.

After the target positioning system, such as a radar device, has scanned the target with scanning signals, such as radar signals, at crossrange beam positions such that target data is received from a plurality of beam positions. The methods, apparatus, and computer program products of the present invention determine a target data relationship between at least two beam positions to determine the angular position of the target relative to one beam position. Advantageously, target data values are received from at least three beam positions, wherein the target data values are used to determine a first beam position to be used in determining the target data relationship. The illustrated embodiment determines the first beam position by comparing at least three consecutive beam positions; however, further embodiments of the present invention may determine the first beam position with at least three non-consecutive beam positions that are separated by additional beam positions. Advantageously, the at least three beam positions have a value above a threshold value, such as 0.3 for the illustrated embodiment, wherein the threshold value is representative of a possible target as opposed to noise or other interference. Further embodiments of the present invention may define alternative threshold values or no threshold value.

The first beam position is determined by comparing the target data values of the at least three beam positions to determine the beam position with the largest target data value. The first beam position is then determined to be that beam position with the largest target data value such that the first target data value of the first beam position is greater than both a second target data value of a second beam position preceding the first beam position and a third target data value of a third beam position following the first beam position. Because the illustrated embodiment determines the first beam position by comparing at least three consecutive beam positions, the second beam position immediately precedes the first beam position and the third beam position immediately follows the first beam position. However, further embodiments of the present invention may comprise first, second, and third beam positions separated by any number of beam positions or may comprise additional beam positions, as noted above.

For target A of FIGS. 1 and 2, the first beam position would be beam position 3 because the target data value 0.9 of beam position 3 is greater than the target data values of 0.4 for each of the beam positions 2 and 4. Thus the second beam position would be beam position 2 and the third beam position would be beam position 4. Further embodiments of the present invention could define the second beam position as beam position 1 and the third beam position as beam position 5. Likewise, for target B, the first beam position of the illustrated embodiment would be beam position 6 because the target data value 0.8 of beam position 6 is greater than the target data values of 0.3 and 0.6 for the beam positions 5 and 7, respectively. Thus the second beam position would be beam position 5 and the third beam position would be beam position 7. Further embodiments of the present invention could define the second beam position as beam position 4 and the third beam position as beam position 8.

By defining the first beam position as the beam position with the greatest target data value and the second and third beam positions as the beam positions preceding or following the first beam position, the methods, apparatus, and computer program products of the present invention recognizes that a target in one beam position may affect the target data value, such as by increasing the target data value, of neighboring beam positions. The largest target data value is presumably for the beam position wherein the target is located, which is the first beam position, and the relative values of the neighboring beam positions indicate where within the first beam position the target is located.

Once the first beam position is determined, relative to the second and third beam positions, a target data relationship between the first, second, and third beam positions is determined to further define the angular position of the target within the first beam position. Advantageously, the target data value relationships are determined in accordance with one aspect of the present invention by processing circuitry such as a microprocessor, a computer, or other computing device. The target data relationship of the illustrated embodiment of the present invention is determined by subtracting the third target data value from the second target data value to determine a difference. Alternatively, the second target data value may be subtracted from the third target data value in further embodiments of the present invention to determine a difference. The difference is divided by the first target data value to determine a normalized quotient. The quotient is normalized because the division cancels the units, such as volts, amps, watts, or the like as described above, of the difference and first target data value, thus the quotient advantageously has no unit denomination.

To determine the angular position of the target, the normalized quotient is multiplied by a constant of the radar device, or other target positioning system, to determine the angular position of the target relative to the first beam position. The angular position of the target relative to the radar device is then determined by adding the angular position of the first beam position to the position of the target that has been determined relative to the first beam position. These additional processing steps are also typically performed by the processing circuitry. Further embodiments of the present invention may comprise alternative methods of determining the angular position of the target relative to the first beam position, such as the non-limiting example of determining the angular position of the target relative to the radar device using a baseline or other predetermined position, from which the angular position of the target relative to the first beam position may be determined.

The constant that is multiplied by the normalized quotient is a predetermined value for the radar device that is used for all the beam positions of the radar device. The constant is advantageously determined by calibrating the radar device. Calibration may be performed by scanning a trial target at a known angular position relative to the radar device to determine the target data values for the beam positions that return a signal for the trial target. The first, second, and third beam positions are determined and the normalized quotient is then determined and compared to the known angular position of the trial target relative to the first beam position to determine the value of the constant. For example, a radar device having a trial target at 1 degree from a known beam position that provides the greatest target data value such that the first, second, and third beam positions will produce a normalized quotient that may be divided into the known value of 1 degree to determine the value of the constant. The value of the constant may be optimized using an optimization technique or may define a variable value in alternative embodiments of the present invention. Further embodiments of the present invention may determine the value of the constant by alternative techniques and may determine the target data relationship by alternative methods. For the illustrated embodiment, wherein the third target data value is subtracted from the second target data value to determine the difference, the value for the constant is −0.8 degrees. It should be appreciated that if the second target data value is subtracted from the third target data value to determine the difference, for the illustrated embodiment, the value for the constant is 0.8 degrees. Further embodiments of the present invention may have any value for the constant.

Referring again to target A of FIGS. 1 and 2, beam position 3 is the first beam position, and beam positions 2 and 4 are the second and third beam positions, respectively, as discussed above. The difference is determined by subtracting the third target data value (0.4) from the second target data value (0.4) to define a difference of 0. Dividing the difference with the first target data value (0.9) provides a normalized quotient of 0, which when multiplied by the constant −0.8 degrees provides a value of 0 degrees. Therefore, the target A is 0 degrees from the centerline of beam position 3, which is at 2.7 degrees, as shown in FIG. 2. Accordingly, the angular position of the target A relative to the radar device is 2.7 degrees.

Likewise, for target B of FIGS. 1 and 2, beam position 6 is the first beam position, and beam positions 5 and 7 are the second and third beam positions, respectively, as discussed above. The difference is determined by subtracting the third target data value (0.6) from the second target data value (0.3) to define a difference of −0.3. Dividing the difference with the first target data value (0.8) provides a normalized quotient of −0.375, which when multiplied by the constant −0.8 degrees provides a value of 0.3 degrees. Therefore, the target B is 0.3 degrees from the centerline of beam position 6, which is at 5.4 degrees, as shown in FIG. 2. Accordingly, the angular position of the target B relative to the radar device is 5.7 degrees.

The methods, apparatus, and computer program products of the present invention may also comprise algorithms to optimize the determined angular positions to provide still further accuracy for the radar device. During the calibration procedure described above, the target data values may be curve-fitted, may undergo a deconvolution process, or may be optimized in similar fashions. By curve-fitting the target data values for the known trial target, the same curve-fitting algorithm may be used during use of the radar device to more accurately determine the angular position of the target. Accordingly, determining the target data relationship comprises curve-fitting the target data values to determine the angular position of the target. Further embodiments of the present invention comprise alternative optimization techniques.

The present invention has been found to provide approximately an order of magnitude improvement in the crossrange resolution of the radar device, thus providing crossrange superresolution. For a radar device such as the Navtech DS2000 described above, the methods, apparatus, and computer program products of the present invention have been found to improve the crossrange resolution from the 3 meter azimuth bin at 100 meters to twelve individual 0.25 meter bins. Furthermore, the crossrange resolution was improved without reducing the frequency at which target data is received. Still further crossrange superresolution is possible; however, it should be appreciated that crossrange superresolution is limited by other variables of target positioning systems, such as the signal to noise (SNR) ratio to list one non-limiting example.

FIG. 3 is a flow chart illustrating steps 20 through 30 for determining the angular position of a target with improved crossrange resolution of a target positioning system according to one embodiment of the present invention. Step 20 comprises scanning the target with scanning signals at crossrange beam positions to receive target data from at least three beam positions. Step 22 comprises determining a first beam position with a first target data value, second beam position with a second target data value, and third beam position with a third target data value, wherein the first target data value is greater than either the second or third target data value. Furthermore step 24 comprises determining a difference between the second target data value and the third target data value. Step 26 comprises dividing the difference by the first target data value to determine a normalized quotient. Step 28 comprises multiplying the normalized quotient by a constant of the radar device to determine the angular position of the target relative to the first beam position. Finally, step 30 comprises adding the angular position of the first beam position to the determined angular position of the target relative to the first beam position to determine the angular position of the target relative to the radar device. Further embodiments of the present invention may comprise additional steps, fewer steps, and/or alternative steps to determine an angular position of a target.

The measurements, determinations, calculations, and other actions provided by the present invention are advantageously performed by an apparatus with processing circuitry, such as a processor or other computing device. Such processor or other computing device advantageously actuates the target positioning system to scan the target with scanning signals and determines the target data relationship to determine the angular position of the target relative to the target positioning system. The various methods of the present invention are generally implemented by a computer program product that may direct the operation of the processing circuitry. This computer program product includes a computer-readable storage medium, such as a non-volatile storage medium, and computer-readable program code portions, such as a series of computer instructions, embodied in the computer-readable storage medium. Further implementations of the present invention may be performed by alternative devices.

It will be understood that each step 20 to 30 of the flowchart can be implemented by or with computer program instructions. These computer program instructions may be loaded onto processing circuitry, such as on a computer or other programmable apparatus to perform the functions of the present invention, such that the instructions which execute on the computer or other programmable apparatus create means for implementing the functions specified in the flowchart blocks or steps. These computer program instructions may also be stored in a computer-readable memory that can direct a computer or other programmable apparatus to function in a particular manner, such that the instructions stored in the computer-readable memory perform the measurements, determinations, and actions illustrated in the flowchart blocks or steps. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart blocks or steps.

Accordingly, blocks or steps of the flowchart of FIG. 3 support combinations of means for performing the specified functions, combinations of steps for performing the specified functions, and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of determining an angular position of a target, the method comprising the steps of:

scanning the target with scanning signals at crossrange beam positions such that target data is received from a plurality of beam positions;

determining a target data relationship between at least two beam positions to determine the angular position of the target relative to one beam position; and determining a first beam position with a first target data value greater than a second target data value of a second beam position preceding the first beam position and greater than a third target data value of a third beam position following the first beam position, wherein the target data relationship is determined between the first, second, and third beam positions to determine the angular position of the target relative to the first beam position.

2. A method according to claim 1 wherein scanning the target comprises receiving target data from at least three consecutive beam positions, and wherein determining the first beam position defines the second beam position as a beam position immediately preceding the first beam position and the third beam position as a beam position immediately following the first beam position.

3. A method according to claim 1 wherein determining the target data relationship comprises determining a difference between the second target data value and the third target data value.

4. A method according to claim 3 wherein determining the target data relationship comprises dividing the difference by the first target data value to determine a normalized quotient.

5. A method according to claim 4 wherein scanning the target comprises scanning the target with a radar device, and wherein determining the target data relationship comprises multiplying the normalized quotient by a constant of the radar device to determine the angular position of the target relative to the first beam position.

6. A method according to claim 5 further comprising an initial step of calibrating the radar device to determine a value for the constant used in determining the target data relationship.

7. A method according to claim 6 wherein calibrating the radar device further comprises scanning a trial target at a known angular position relative to the radar device to determine the value of the constant.

8. A method according to claim 1 wherein scanning the target comprises transmitting scanning signals having a predetermined beamwidth, wherein the beam positions are separated by an angular distance that is generally half the beamwidth of the scanning signals.

9. A method according to claim 1 wherein determining the first beam position comprises receiving the first target data value which is greater than a threshold value.

10. A method of determining an angular position of a target, the method comprising the steps of:

scanning the target with scanning signals at crossrange beam positions such that target data is received from a plurality of beam positions;

determining a target data relationship between at least two beam positions to determine the angular position of the target relative to one beam position; and curve-fitting the target data values to determine the angular position of the target.

11. A method of determining an angular position of a target with a radar device, the method comprising the steps of:
  scanning the target with radar signals at crossrange beam positions such that target data is received from at least three consecutive beam positions;
  determining a first beam position with a first target data value greater than a second target data value of a second beam position immediately preceding the first beam position and greater than a third target data value of a third beam position immediately following the first beam position;
  determining a difference between the second target data value and the third target data value;
  dividing the difference by the first target data value to determine a normalized quotient; and
  multiplying the normalized quotient by a constant of the radar device to determine the angular position of the target relative to the first beam position.

12. A method according to claim 11 wherein scanning the target comprises transmitting radar signals having a predetermined beamwidth, wherein the beam positions are separated by an angular distance that is generally half the beamwidth of the radar signals.

13. An apparatus for determining an angular position of a target, the apparatus comprising:
  processing circuitry for: (i) receiving target data from a plurality of beam positions traversed during scanning of the target with scanning signals at crossrange beam positions; and (ii) determining a target data relationship between at least two beam positions to determine the angular position of the target relative to one beam position,
  wherein the processing circuitry determines a first beam position with a first target data value greater than a second target data value of a second beam position preceding the first beam position and greater than a third target data value of a third beam position following the first beam position, and
  wherein the target data relationship is determined between the first, second, and third beam positions to determine the angular position of the target relative to the first beam position.

14. An apparatus according to claim 13 wherein the processing circuitry receives target data from at Least three consecutive beam positions, and wherein the processing circuitry defines the second beam position as a beam position immediately preceding the first beam position and the third beam position as a beam position immediately following the first beam position.

15. An apparatus according to claim 13 wherein the processing circuitry determines a difference between the second target data value and the third target data value.

16. An apparatus according to claim 15 wherein the processing circuitry divides the difference by the first target data value to determine a normalized quotient.

17. An apparatus according to claim 16 wherein the target is scanned with radar signals transmitted by a radar device, and wherein the processing circuitry multiplies the normalized quotient by a constant of the radar device to determine the angular position of the target relative to the first beam position.

18. An apparatus according to claim 17 wherein the processing circuitry is capable of calibrating the radar device to determine a value for the constant used in determining the target data relationship.

19. An apparatus according to claim 18 wherein the processing circuitry is capable of calibrating the radar device by scanning a trial target at a known angular position relative to the radar device to determine the value of the constant.

20. An apparatus according to claim 13 wherein the processing circuitry facilitates the transmission of scanning signals having a predetermined beamwidth, wherein the beam positions are separated by an angular distance that is generally half the beaniwidth of the scanning signals.

21. An apparatus according to claim 13 wherein the processing circuitry is capable of receiving the first target data value which is greater than a threshold value.

22. An apparatus for determining an angular position of a target, the apparatus comprising:
  processing circuitry for: (i) receiving target data from a plurality of beam positions traversed during scanning of the target with scanning signals at crossrange beam positions; and (ii) determining a target data relationship between at least two beam positions to determine the angular position of the target relative to one beam position,
  wherein the processing circuitry curve-fits the target data values, to determine the angular position of the target.

23. A computer program product for determining an angular position of a target, the computer program product comprising a computer-readable storage medium having computer-readable program instructions stored therein, the computer-readable program portions comprising:
  a first executable portion for scanning the target with scanning signals at crossrange beam positions such that target data is received from a plurality of beam positions; and
  a second executable portion for determining a target data relationship between at least two beam positions to determine the angular position of the target relative to one beam position,
  wherein the second executable portion is further capable of determining a first beam position with a first target data value greater than a second target data value of a second beam position preceding the first beam position and greater than a third target data value of a third beam position following the first beam position, and wherein the target data relationship is determined between the first, second, and third beam positions to determine the angular position of the target relative to the first beam position.

24. A computer program product according to claim 23 wherein the first executable portion is further capable of receiving target data from at least three consecutive beam positions, and wherein the second executable portion is further capable of defining the second beam position as a beam position immediately preceding the first beam position and the third beam position as a beam position immediately following the first beam position.

25. A computer program product according to claim 23 wherein the second executable portion is further capable of determining a difference between the second target data value and the third target data value.

26. A computer program product according to claim 25 wherein the second executable portion is further capable of dividing the difference by the first target data value to determine a normalized quotient.

27. A computer program product according to claim 26 wherein the first executable portion scans the target with a radar device, and wherein the second executable portion is further capable of multiplying the normalized quotient by a constant of the radar device to determine the angular position of the target relative to the first beam position.

28. A computer program product according to claim 27, further comprising an initial executable portion prior to the first executable portion, wherein the initial executable portion calibrates the radar device to determine a value for the constant used in determining the target data relationship.

29. A computer program product according to claim 28 wherein the initial executable portion is further capable of scanning a trial target at a known angular position relative to the radar device to determine the value of the constant.

30. A computer program product according to claim 23 wherein the first executable portion is further capable of transmitting scanning signals having a predetermined beamwidth, wherein the beam positions are separated by an angular distance that is generally half the beamwidth of the scanning signals.

31. A computer program product according to claim 23 wherein the second executable portion is further capable of receiving the first target data value which is greater than a threshold value.

32. A computer program product for determining an angular position of a target, the computer program product comprising a computer-readable storage medium having computer-readable program instructions stored therein, the computer-readable program portions comprising:

a first executable portion for scanning the target with scanning signals at crossrange beam positions such that target data is received from a plurality of beam positions; and a second executable portion for determining a target data relationship between at least two beam positions to determine the angular position of the target relative to one beam position, wherein the second executable portion curve-fits the target data values to determine the angular position of the target.

* * * * *